United States Patent [19]

Kataoka

[11] Patent Number: 4,748,560

[45] Date of Patent: May 31, 1988

[54] OCCUPANCY CONTROL SYSTEM FOR PLURAL SERIAL BUSES

[75] Inventor: Isaburou Kataoka, Nagasaki, Japan

[73] Assignee: Mitsubishi Denki Kabushiki Kaisha, Tokyo, Japan

[21] Appl. No.: 786,826

[22] Filed: Oct. 11, 1985

[30] Foreign Application Priority Data

Oct. 15, 1984 [JP] Japan .................................. 59-215659

[51] Int. Cl.⁴ ...................... G06F 13/14; H01H 67/00; H04J 3/02
[52] U.S. Cl. .............................. 364/200; 340/825.01; 340/825.03; 370/85; 371/8
[58] Field of Search ... 364/200 MS File, 900 MS File; 340/825.01, 825.03, 825.05, 825.5, 825.51; 370/85, 86, 89; 371/7, 8, 11

[56] References Cited

U.S. PATENT DOCUMENTS

| | | | |
|---|---|---|---|
| 3,806,885 | 4/1974 | Moore | 364/200 |
| 4,228,496 | 10/1980 | Katzman et al. | 364/200 |
| 4,379,294 | 4/1983 | Sutherland | 340/825.5 |
| 4,437,158 | 3/1984 | Alfke et al. | 364/200 |
| 4,439,856 | 3/1984 | Ulug | 370/85 |
| 4,442,502 | 4/1984 | Friend et al. | 364/900 |
| 4,464,749 | 8/1984 | Ulug | 370/85 |
| 4,536,838 | 8/1985 | Ringel et al. | 364/200 |
| 4,547,879 | 10/1985 | Hamelin | 370/86 |
| 4,575,842 | 3/1986 | Katz et al. | 371/7 |
| 4,593,282 | 6/1986 | Acampora et al. | 340/825.51 |
| 4,608,700 | 8/1986 | Kirtley et al. | 364/900 X |
| 4,611,274 | 9/1986 | Machino et al. | 364/200 |
| 4,648,088 | 3/1987 | Cagle et al. | 371/8 |

Primary Examiner—Archie E. Williams, Jr.
Assistant Examiner—Florin Munteanu
Attorney, Agent, or Firm—Bernard, Rothwell & Brown

[57] ABSTRACT

Plural stations are connected to two independent serial buses and they are permitted to occupy a first serial bus in a predetermined order under control of a bus controller. A second serial bus is used for transmitting to the bus controller an urgent bus occupancy request issued by any of the stations. Upon receipt of the urgent bus occupancy request, the bus controller permits the request-issuing station to occupy the first serial bus regardless of the predetermined order, thereby insuring a fault-free operation of the system for transmitting data between the stations.

2 Claims, 3 Drawing Sheets

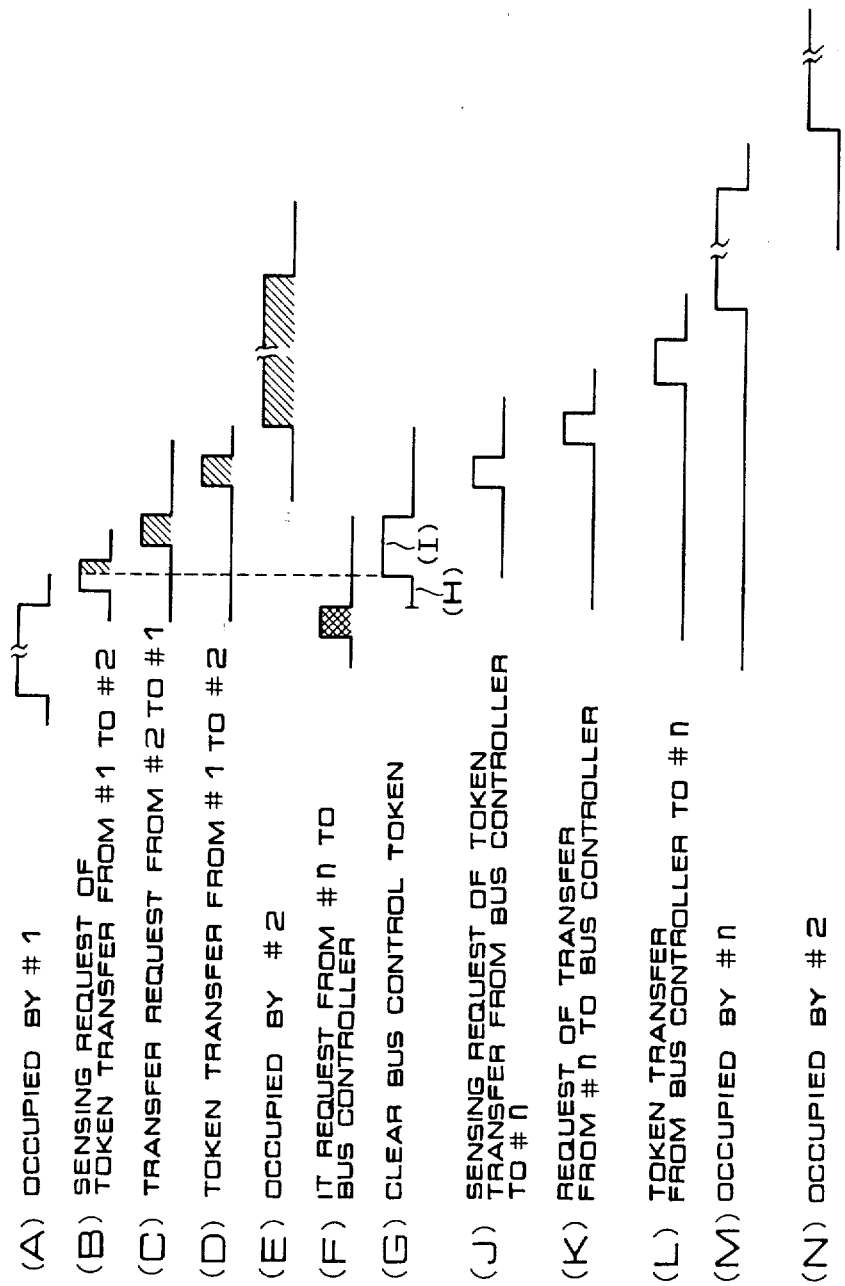

OCCUPANCY CONTROL SYSTEM FOR PLURAL SERIAL BUSES

BACKGROUND OF THE INVENTION

1. Field of the Invention

The present invention relates to a system for controlling a serial bus in a computer network so that any one of plural stations connected to the serial bus can be occupied.

2. Description of the Prior Art

Heretofore, as serial bus controlling systems of this type, there have been known a token pass system and a CSMA system. According to the former, the right of occupancy (called token) is allowed to cycle to stations, i.e., host computers, in good order. According to the latter system, each station can request the right of occupancy of a serial bus freely if necessary. FIG. 1(a) shows a conventional token pass system, in which T1, T2 and T3 each represent a station. And in FIG. 1(b), $T_{t1}$, $T_{t2}$ and $T_{t3}$ indicate a state transition (time zone) of the right of occupancy for a bus TB. The stations T1, T2 and T3 can each occupy the bus TB in good order along the timing of the host computers $T_{t1}$, $T_{t2}$ and $T_{t3}$ which have a state transition of the right of occupancy.

In other words, in the absence of any time zone of the state transitions $T_{t1}$, $T_{t2}$ and $T_{t3}$ of the right of occupancy, the stations T1, T2 and T3 cannot occupy the bus even when the bus is in a state desiring data.

In the serial bus control according to the above token pass system, each station can occupy the bus only at the time zone allocated to itself; in other words, except this time zone, it cannot occupy the bus even in case of emergency. According to the CSMA system, it is possible to request the occupancy of bus if necessary, but it is not sure whether the right of bus occupancy will be obtained or not.

SUMMARY OF THE INVENTION

It is an object of the present invention to provide a serial bus controlling system which normally controls the occupancy of a serial bus in accordance with the token pass system described above, but permits the occupancy of the bus when one of plural stations makes an urgent request for occupying the bus.

A system according to the present invention for controlling the occupancy of a serial bus between plural stations connected to the serial bus includes a second serial bus having a function independent of the above serial bus and a bus controller for controlling the occupancy of both said serial buses; said stations each having a host computer, a transmission station for transmission and reception of signals through the first and second serial buses under control of the host computer, and means provided in the transmission station for sending an interrupt request signal to the second serial bus in response to an urgent occupancy request issued by the host computer; said bus controller having means for performing a token pass control to permit the stations to occupy the first serial bus successively in a predetermined order when none of the stations send an interrupt request signal to the second serial bus, and means for detecting an interrupt request signal provided from any one of the stations to the second serial bus, suspending the token pass control and permitting the interrupt request signal-issuing station to occupy the first serial bus.

By the provision of the second serial bus in addition to the first serial bus, there can be obtained a serial bus controlling system which is superior in response characteristic and assures positive operations, as compared with controls according to the conventional token pass system and CSMA system. Moreover, for improving the reliability of bus, even in the event of breaking of a regular bus, control is switched over to the other bus (normally an interrupt request line), so even in the worst case the conventional baton pass system can be satisfied, and thus a highly versatile control system is attainable.

BRIEF DESCRIPTION OF THE DRAWINGS

FIG. 3 is a timing chart showing the progress of control executed by the system of FIG. 2.

DETAILED DESCRIPTION OF THE PREFERRED EMBODIMENT

Figure 2:
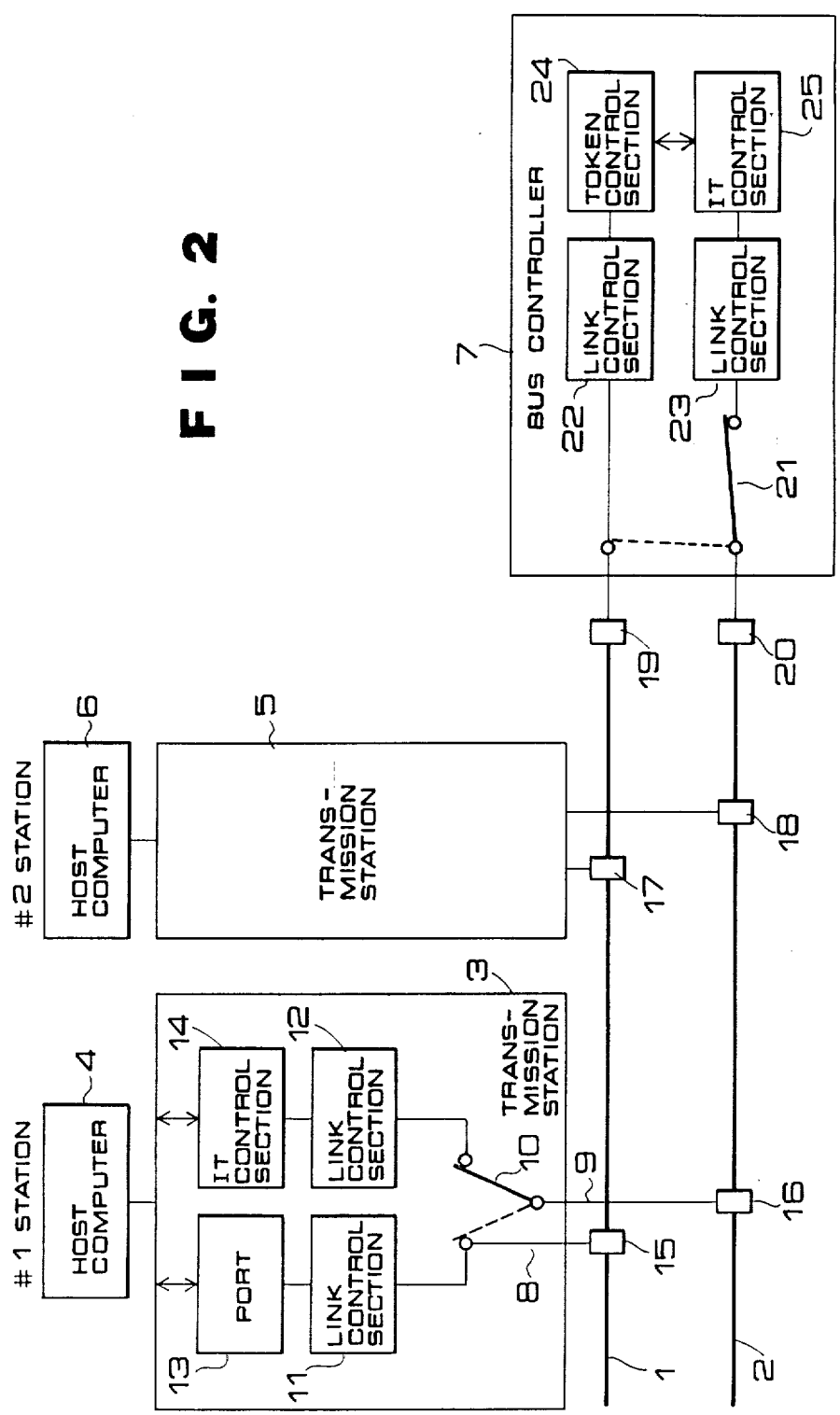
FIG. 2 is a block diagram showing a serial bus control system according to the present invention.

Referring to FIG. 2, there are shown two parallel serial buses 1 and 2 independent of each other, a plurality of stations (only two stations #1 and #2 are shown in FIG. 2 for simplification) which exchange communications through both buses, and a bus controller 7 connected for control to the serial buses 1 and 2.

The #1 station is provided with a transmission station 3 and a host computer 4. The transmission station 3 has link control sections 11 and 12, a port section 13 and an IT (interrupt) control section 14. The link control section 11 is connected to the port section 13 and also connected to the first serial bus 1 through a cable 8 and a node terminal 15. The other link control section 12 is connected to the IT control section 14 and also connected to the second serial bus 2 through a cable 9 having a change-over switch 10 and further through a node terminal 16. The switch 10 is normally in a position in which the second serial bus 2 is connected to the link control section 12. But in the event of trouble of the first serial bus 1, the switch 10 is changed over to a position (indicated by a broken line in the figure) in which the second bus 2 is connected to the other link control section 11.

The port section 13 functions to store the data provided from the host computer 4 or the link control section 11, and the link control section 11 has both function of sending the data stored in the port section 13 to the bus 1 as a transmission signal of a predetermined waveform and function of transforming a transmission signal received from the bus 1 into a signal form suitable for storage in the port portion. Further, the link control section 11 has all functions required for linking between the port section 13 and the serial bus 1, including detection of any trouble in the transmission and reception of a transmission signal and performing retry of transmission. The interrupt control section 14 receives an urgent request for signal transmission from the host computer 4 and sends an urgent bus occupying request to the link control section 12. Basic function of the link control section 12 is substantially the same as that of the link control section 11 already explained. Concrete constructions of the host computer, the port portion and the link control sections are known to those skilled in the art, so their detailed explanations are here omitted. The function of the IT control section is also obvious to those skilled in the art.

The #2 station has a host computer 6 and a transmission station 5. The transmission station 5, which is the same as the transmission station 3 described above, is connected to the serial buses 1 and 2 through node terminals 17 and 18 respectively.

The bus controller 7 controls the right of occupancy of the serial buses 1 and 2 through node terminals 19 and 20. The numeral 21 denotes a change-over switch having a backup function for changing over the signal medium from the serial bus 1 to the serial bus 2 in the event of breaking of the bus 1, like the transmission change-over switch 10. Numerals 22 and 23 denote link control sections which are the same as the link control sections 11 and 12 previously described; numeral 24 denotes a token control section which controls the right of occupancy, including a control right of high priority request of an ordinary token control section; and numeral 25 denotes an IT (interrupt) control section.

Figure 1A:
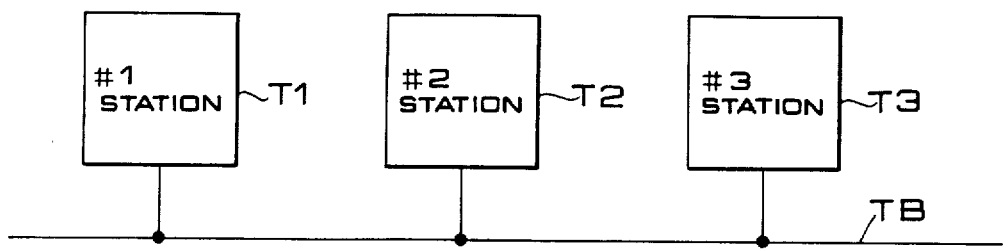
FIG. 1(a) is a diagram showing a connection between a serial bus and stations in a conventional serial bus control system and FIG. 1(b) is a timing chart showing a transition state of token of each station in the control system of FIG. 1(a)
Figure 1:
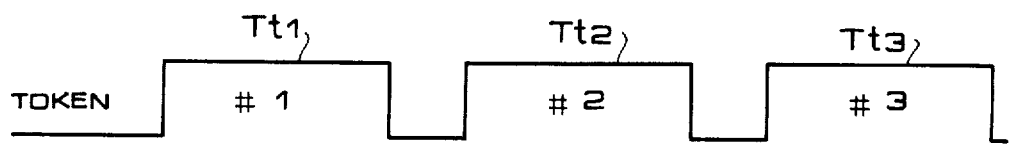
Figure 4:
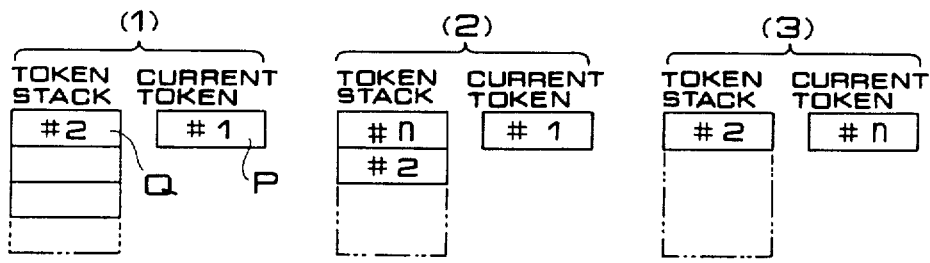
FIG. 4 shows a sequence of token control in the control executed by the system of FIG. 2.

The control operation of the bus token control system of this embodiment will now be described with reference to FIGS. 3 and 4 which show a state transition of the serial bus 1 and a state transition in the token control of the bus controller 7, respectively. In FIG. 3, numeral (A) represents a token occupied by the #1 station. Once the #1 station possesses the right of occupancy of the serial bus 1, it performs a data transmission processing, and upon completion of this processing, it asks the #2 station about whether it is necessary or not to effect the transfer of token to the station #2 ((B) in FIG. 3). The #2 station gives a reply to the #1 station (C). If the token is not needed for the #2 station, the same inquiry is made from the #1 station to the #3 station. It is here assumed that the #2 station sends back at (C) the necessity of the token transfer and the #1 station perceives it and transmits a token transfer command to the station #2 (D). (A) to (C) in FIG. 3 correspond to (P) in FIG. 4. A current token (P) stores the station which presently possesses the token. In a token stack (Q) there is detected an interrupt request from #n station, namely, (F) in FIG. 3, and an interruption-free state, that is, the #2 station to which the token is to be next transferred is in storage. In this case, if the interrupt (IT) request signal of (F) in FIG. 3 is not generated, the #2 station can possess the right of bus occupancy, which state corresponds to (E) in FIG. 3. So the bus controller 7 accepts the interrupt (IT) request from the #n station at the timing of (F), whereupon a state transition is made to the state of (2) in FIG. 4 in which in the token stack the #n station is shifted to the top (execution priority) and the #2 station shifted therebelow. This state corresponds to (H) in FIG. 3. At the end of the data transmission processing (permitted only during possession of the token) of the #1 station, a token clear command signal is transmitted from the bus controller 7 to the bus, like (G) in FIG. 3. It follows that the hatched pulses shown in (B) to (E) in FIG. 3 are actually not present. Token Clear is a top command on token, and upon issuance thereof all the stations transfer the right of bus occupancy to the bus controller and assume a standby state. Then, the bus controller performs a token transfer control like (J) through (M) in the same procedure as before. As a result, the token transfers to the #n station, and this state corresponds to (L) and (M) in FIG. 3 ((3) in FIG. 4). When it becomes unnecessary for the #n station to possess the token, the bus controller 7 transfers the token to the #2 station. The right of transfer of the token is originated when in the bus controller 7 the top of the current token and that of the stack token in FIG. 4 are not in the regular order. In the case of the regular order, the token transfer right is originated from a station other than the bus controller.

Although in the above embodiment the stations have an equal right with respect to the serial buses 1 and 2, any one station may be a master station having the right of the bus controller and the other stations may be secondary stations. Even in this case, the same effect as above can be obtained.

Further, although explanation has not been made above about the procedure for performing an interrupt request through a serial bus, this is because it can be done even by a sequential procedure in which the bus controller asks each station cyclically about the presence or absence of a interrupt request. The form of the serial bus transmission frame is not specially limited if only it satisfies the form of Frame Header-Destination Station-Sender Station-Command-Data-Frame Check Code. It is not influenced by frame format.

What is claimed is:

1. A system for controlling the occupancy of a first serial bus between plural stations connected to said first serial bus, said system comprising:

a second serial bus having a function independent of said first serial bus, said stations also being connected to said second serial bus, and a bus controller connected to said first and second serial buses for controlling the occupancy of both of said serial buses;

said stations each having a host computer, a transmission station for transmission and reception of signals through said first and second serial buses under control of said host computer, and means provided in said transmission station for sending an interrupt request signal to said second serial bus in response to an urgent occupancy request issued by said host computer;

said bus controller having means for performing a token pass control to permit the stations to occupy said first serial bus successively in a predetermined order when none of the stations send an interrupt request signal to said second serial bus, and means for detecting an interrupt request signal provided from any one of the stations to said second serial bus, suspending the token pass control and permitting the interrupt request signal-issuing station to occupy said first serial bus;

each of said transmission stations including a port section and a first link control section connected to each other, said port section being connectible to said second serial bus through said first link control section in the event of a fault in said first serial bus, said bus controller including a token control section connected to a second link control section, said token control section being connectible to said second serial bus through said second link control section, a first switch in each transmission station for connecting said port section of the station to said second serial bus in the event of a fault in said first serial bus and a second switch in said bus controller for connecting said token control section to said second serial bus in the event of a fault in said first serial bus.

2. A system according to claim 1, wherein each said transmission station has said first link control section for data transmission and a third link control section for transmission of an interrupt request signal, said means for sending an interrupt request signal including said third link control section, said first and third link control sections being connected to said first and second serial buses, respectively, and wherein said bus controller has a token control section connected to said first serial bus through a fourth link control section and an interrupt control section connected to said second serial bus through said second link control section.

* * * * *